Jan. 3, 1956 N. F. ANDREWS 2,729,045
AUXILIARY HARVESTING ATTACHMENT FOR ROW-CROP HARVESTER
Filed Nov. 4, 1954 3 Sheets-Sheet 1
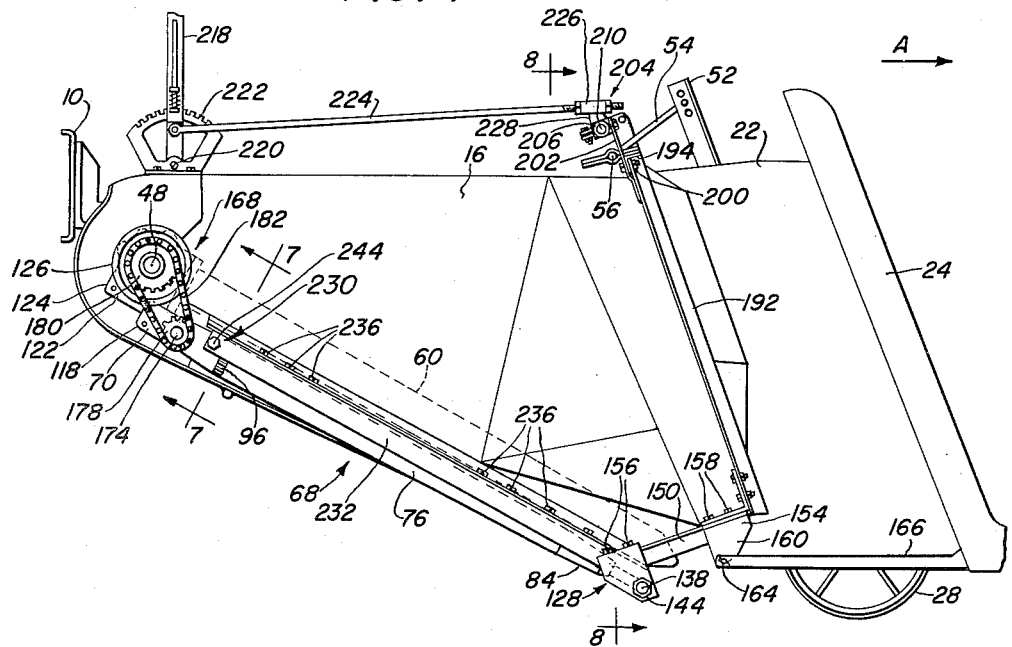
FIG. 1
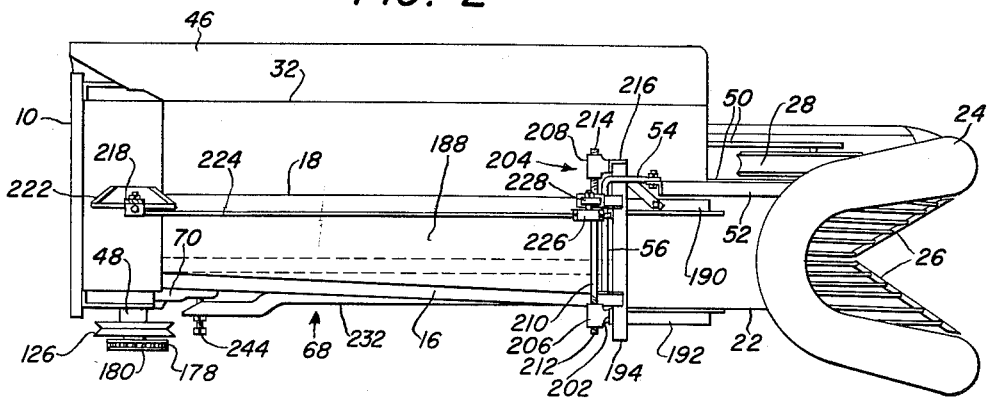
FIG. 2
FIG. 3
INVENTOR.
N. F. ANDREWS

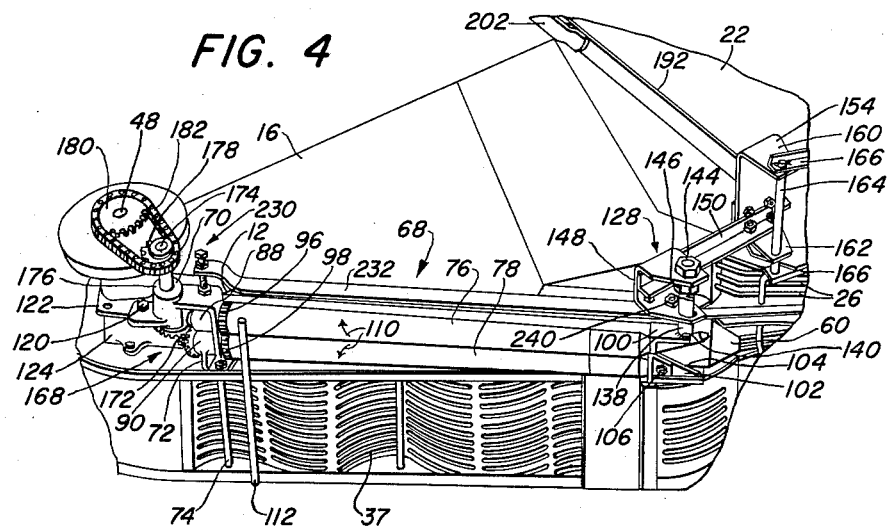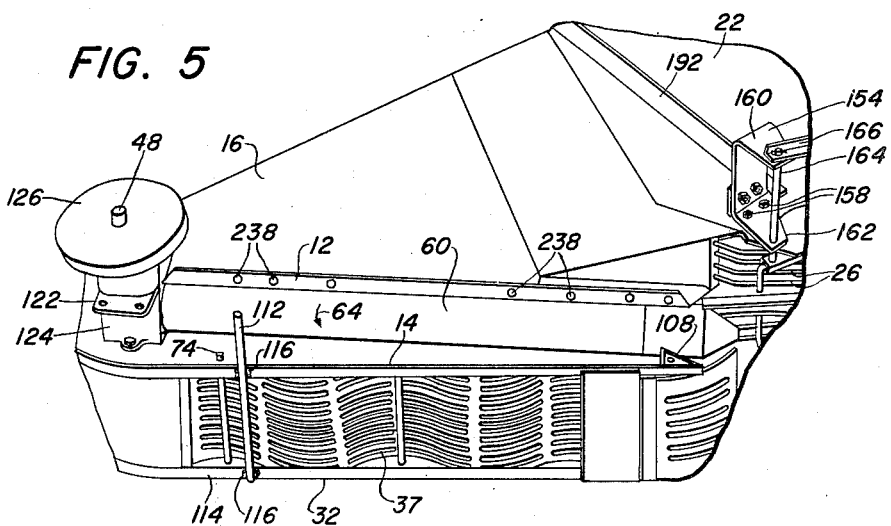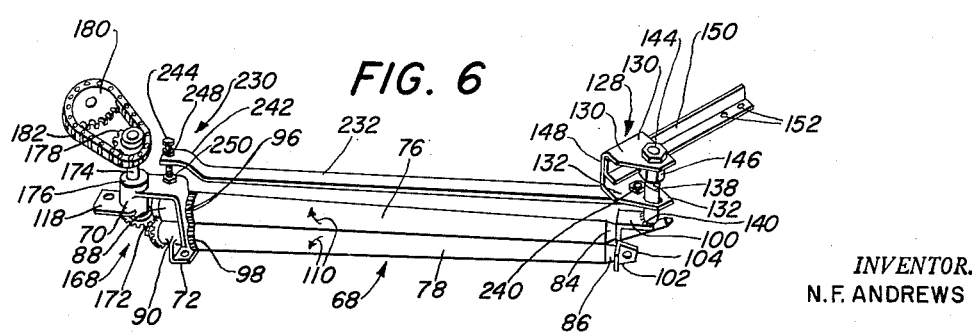

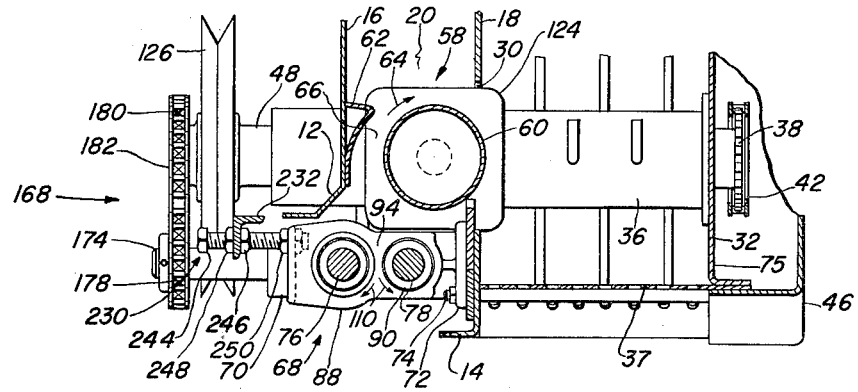
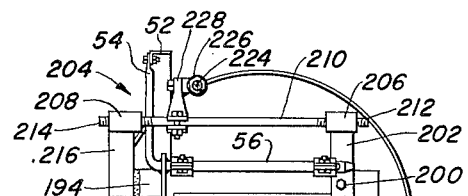
FIG. 7
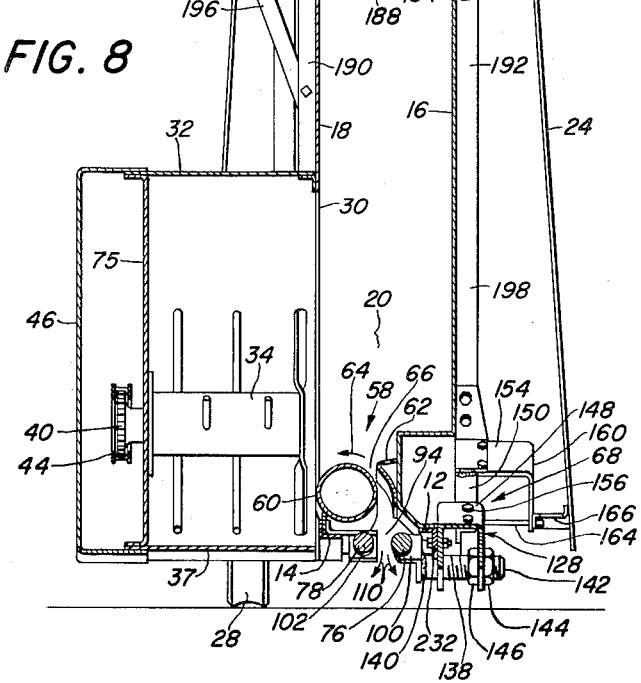
FIG. 8
INVENTOR.
N. F. ANDREWS

United States Patent Office

2,729,045
Patented Jan. 3, 1956

2,729,045

AUXILIARY HARVESTING ATTACHMENT FOR ROW-CROP HARVESTER

Norman F. Andrews, Des Moines, Iowa, assignor to Deere Manufacturing Co., Dubuque, Iowa, a corporation of Iowa Application November 4, 1954, Serial No. 466,736

7 Claims. (Cl. 56—33)

This invention relates to a harvester and more particularly to anti-clogging means for a harvester of the row-crop type.

One particular type of harvester in which the present invention finds its greatest utility is a harvester of the cotton stripper type, such as shown in the U. S. patent to Roscoe 2,533,510, wherein it will be seen that the harvesting unit of the machine includes a pair of upwardly and rearwardly inclined, transversely spaced apart supports, including inner and outer side sheets, between which is defined a fore-and-aft extending plant-receiving passageway in which the row-planted crops are received as the machine advances. Within the housing structure afforded by the side sheets and defining the plant passageway is harvesting means operative to detach crops from the stalks of the plants received in the passageway, the stalks remaining borne by the ground. It has been found in the operation of machines of the character referred to above that in some conditions the root growth of the stalks is such that the upward force exerted by the harvesting means tends to pull the stalks from the ground and the stalks consequently move upwardly into the harvesting means and accumulate to such extent as to clog the harvesting means. It has been previously known, of course, to utilize some means for exerting a downward force on the stalks so as to prevent uprooted stalks from clogging the harvesting means. However, these means have, as far as is known, never been commercially acceptable for various reasons, including primarily the cost of manufacture and the difficulty of maintaining them in normal operation. Moreover, most such devices must be integrated with the machine and cannot be provided as an attachment which can be installed or removed to satisfy the particular conditions.

According to the present invention, these disadvantages are eliminated. Primarily, it is a feature of the invention to provide an improved stalk-clearing device in the form of an attachment including a pair of stalk-engaging rolls mountable on the harvester unit to define a fore-and-aft extending stalk-receiving bite substantially in vertical alinement with the plant-receiving passageway, the rolls being rotatable in such direction that their inner surfaces travel downwardly to exert a downward force on stalks and thus preventing the stalks from being uprooted or preventing uprooted stalks from moving upwardly into the harvesting means. The device features a simple and inexpensive design and one that includes attaching parts enabling it to be readily attached to or detached from harvesters of existing construction without materially altering the basic design of the harvester. The invention has another characteristic in that the stalk-engaging rolls are relatively adjustable to vary the width of the stalk bite. This adjustability is tied in with means for adjusting the spacing between the side sheets and supports carried thereby, which latter adjustment effects variations in width of the plant passage.

The foregoing and other important objects and desirable features inherent in and encompassed by the present invention will become apparent as a preferred embodiment of the invention is disclosed in detail in the ensuing specification and accompanying sheets of drawings, the several figures of which are described immediately below.

Fig. 1 is a side elevational view of a typical harvesting unit, the attachment being mounted in place thereon.

Fig. 2 is a plan view of the same.

Fig. 3 is a plan view of the stalk-clearing attachment per se, a portion thereof being shown in section to illustrate the adjustability of the stalk rolls.

Fig. 4 is a perspective view of the bottom part of a harvesting unit equipped with the stalk-clearing device.

Fig. 5 is a similar perspective bottom view showing the appearance of the harvesting unit with the stalk-clearing device removed.

Fig. 6 is a perspective bottom view of the stalk-clearing device per se.

Fig. 7 is a transverse sectional view, on an enlarged scale, as seen substantially along the line 7—7 of Fig. 1 and illustrating the relationship between the stalk rolls and the harvesting means.

Fig. 8 is a transverse sectional view as seen along the line 8—8 of Fig. 1, the view being drawn to a scale enlarged over that of Fig. 1 but reduced as respects that of Fig. 7.

Familiarity with the basic harvester construction will be assumed because of the above reference to the patent to Roscoe. In general, the harvesting unit is mounted on a tractor for advance over a field of row-planted stalk-borne crops. The harvester unit chosen for the purposes of the present disclosure is shown best in Figs. 1, 2 and 5, wherein the numeral 10 designates a frame member or mount for attaching the harvester unit to a tractor for propulsion over the field, the harvester unit having its length parallel to the line of advance. The harvester unit shown here comprises inner and outer fore-and-aft extending supports 12 and 14 (Figs. 5, 7 and 8), here in the form of angle bars that incline upwardly and rearwardly from the front end of the machine. The front end of the harvester may be determined on the basis of the presence of the arrow A, which indicates the direction of advance. Inner and outer side sheets 16 and 18, respectively, are secured to and rise from the inner and outer supports 12 and 14, these side sheets being generally upright and combining with the supports 12 and 14 to provide or define a fore-and-aft extending plant-receiving passageway indicated by the numeral 20 (Figs. 7 and 8). The entrance to the passageway 20 is afforded by a gathering hood 22 having an inverted U-shaped or arch member 24 equipped at its bottom with plant lifters or guide bars 26, as is generally conventional.

The level of the rear end of the harvester unit is established by the mounting thereof on the tractor by means of the support or bracket 10, and the level of the forward end is established by the provision of a ground-engaging or gauge wheel 28.

The outer side sheet 18 is provided with a fore-and-aft elongated opening 30 through which harvested crops, in a manner to be described, are moved laterally into a fore-and-aft extending conveyor housing 32 (Figs. 7 and 8). A plurality of rotary conveyors 34 and 36 operate in the conveyor housing 32 and over a perforated bottom 37 therein to move the harvested crops rearwardly to crop-receiving means (not shown). The rotary means 34 and 36 are equipped respectively with sprockets 38 and 40 appropriately driven by chains 42 and 44, in a manner outlined in the above-identified Roscoe patent and deemed to be of significance here to no greater extent than necessary to orient the over-all structure. The drive means comprising the sprockets 38 and 40 and chains 42 and 44 are suitably enclosed in a cover casing 46.

Mounting of the harvester unit on the bracket or support 10 is accomplished by means providing a transverse pivot coaxial with or about a drive or power output shaft 48. Apart from the driving characteristics of the shaft 48, which may derive power from any suitable source (not shown), the pivot enables vertical adjustment of the forward part of the harvester unit, which adjustment is accomplished by means of the gauge wheel 28. This gauge wheel is carried on fore-and-aft extending arms 50 which are vertically adjustable by means of an adjusting link 52 connected to one end of an arm 54 rigid on a transverse rockshaft 56. Angular movement of the rockshaft (by suitable means not shown) causes vertical movement of the link 52 which in turn exerts a downward force on the gauge wheel arms 50, the reaction effecting vertical adjustment of the harvester unit about the transverse pivot at 48. The structure and function just described form no part of the present invention but are mentioned briefly because the parts involved are shown as components of the basic harvester unit.

As the machine advances, ground-borne plants are received in the plant passageway 20, wherein the crops are detached from the passageway-received stalks through the medium of harvesting means designated here generally by the numeral 58 (Figs. 7 and 8). The harvesting means shown here is typical of that in the above-mentioned Roscoe patent and comprises a harvester roll 60 rotatable about an upwardly and rearwardly inclining axis and cooperative with a stripper bar 62 parallel thereto and secured to and forming a part of the inner side sheet 16. The direction of rotation of the harvester roll 60 is indicated by the arrow 64, the elongated roll and its elongated companion stripper bar 62 defining a fore-and-aft extending crop-detaching bite 66.

Because of the rotation of the harvester roll 60 in the direction indicated (arrow 64), the roll exerts an upward force on the stalk-borne crops which, combined with the advance of the machine relative to the ground, tends in some conditions to uproot the ground-borne stalks. In a conventional machine, the stalks will tend to be drawn upwardly into the stalk passageway 20 and will ultimately accumulate and create a clogged condition, necessitating stoppage of the machine to afford an opportunity to rid the passageway of the offending accumulation.

Elimination or at least alleviation of the above-described condition is accomplished by the stalk-clearing device based on the principles of the present invention. The device is shown here by itself in Figs. 3 and 6 and is designated in its entirety by the numeral 68. The device, in its preferred embodiment, comprises a rear mounting bracket 70 in the form of a casting having an outer apertured mounting flange 72 thereon which affords means for affixation of the bracket 70 to the outer support 14 and lower part of the outer side sheet 18, affixation being completed by one or more bolts, as at 74, the bolt shown here being a tie bolt that extends crosswise between the lower portions of the side sheet 14 and an outer upright wall 75 of the conveyor housing 32. This is one example of how the existing structure of the machine is utilized in adapting the attachment of the device 68 thereto. In its broader aspects, however, the invention contemplates the mounting of the bracket 70 other than in the specific manner noted.

The device 68 further includes inner and outer elongated stalk-engaging rolls 76 and 78 respectively having rear ends in the form of shafts 80 and 82 and further respectively having tapered front ends 84 and 86. The rear ends of the rolls 76 and 78 are individually journaled in fore-and-aft extending bearing portions 88 and 90 of the bracket 70 for rotation respectively on generally fore-and-aft extending axes, here inclining upwardly and rearwardly in general parallelism to the harvester roll 60. The bearing for the rear end 80 of the inner roll 76 includes a spherical member 92 (Fig. 3) of conventional design affording a generally upright axis about which the roll may be swung transversely relative to the roll 78 and thereby to enable variations in the width of a stalk-receiving bite 94 defined between the rolls.

The rolls are driven by drive means, to be described in detail later, including intermeshing gears 96 and 98 coaxially fixed respectively to the rolls and located just ahead of the rear bracket 70.

The front end 84 of the inner stalk roll 76 is journaled in a front inner bearing 100, which is closely alongside a front outer bearing 102 which journals the front end 86 of the other stalk roll 78. The bearing 102 has an apertured mounting part 104 which receives a bolt 106 for accomplishing mounting means for effecting the affixation of the bearing 102 to the front end of the outer support 14. The front end of the support 14 may be originally or subsequently provided with an apertured mounting element 108 by means of which affixation of the front outer bearing 102 is effected.

The mounting of the front inner bearing 100 will be described immediately below. But for present purposes let it be assumed that the bearing is mounted in such manner that it cooperates with the other bearing 102 for carrying the front ends of the rolls 76 and 78. As previously described, the rear ends of the rolls are journaled in the mounting or bearing bracket 70 at the rear of the supports. Consequently, the stalk-receiving bite 94 defined by the rolls is substantially in vertical alinement with the plant-receiving passageway 20 and further with the bite defined between the harvester roll 60 and its companion stripper bar 62. The intergearing of the rolls at 96 and 98 causes the rolls to rotate in unison but in opposite directions as indicated by the arrows 110 so that the inner surfaces thereof move downwardly in the bite 94. Consequently, the rolls will exert downward forces on passageway-received stalks which will counteract the upward force exerted by the harvester roll 60 and will therefore prevent the stalks from being uprooted or if they are uprooted will prevent them from entering the passageway 20. The efficiency of the device is further augmented by the use of a transverse trash bar 112 which extends crosswise beneath the rolls so that stalks moving toward the rear ends of the rolls will be prevented from entangling in the gears 96 and 98. At the same time, these stalks will be pushed forwardly and will be further driven downwardly by the rolls 76 and 78. Attachment of the trash bar 112 to the outer support 14 and a lower marginal edge portion 114 of the conveyor housing 32 may be accomplished by welding as at 116. However, other methods of affixation may be resorted to.

Mounting of the rear bracket 70 on the harvester unit is augmented by the provision on the bracket of an integral apertured flange 118 adapted to receive a bolt 120 which passes through an apertured flange 122 on a drive housing 124 in which the rear end of the harvester roll 60 is journaled. The casing 124 contains suitable mechanism (not shown) by means of which the harvester roll 60 is driven from the power output member or shaft 48, the shaft 48 projecting laterally inwardly from the inner side sheet 16 and having fixed thereto a drive sheave 126 by means of which power may be delivered thereto from the tractor (not shown). The details of the drive are unimportant except to the extent that the shaft 48 constitutes a power output member which, in addition to driving the roll 60, serves as means for driving the stalk rolls 76 and 78. This phase of the disclosure will be amplified below.

Mounting of the front inner bearing 100 for the front end 84 of the inner stalk roll 76 is effected by a front mounting bracket, designated in its entirety by the numeral 128. This bracket comprises inner and outer legs 130 and 132, respectively apertured at 134 and 136 to carry a transverse adjusting member in the form of a shaft 138. The outer end of the shaft is welded, as at 140, to the front inner bearing 100 and the inner end of the shaft is threaded at 142 to carry inner and outer adjusting or jam nuts 144 and 146, which nuts respectively abut opposite sides of the leg 130 of the bracket 128.

As will be seen, the bracket 128 is in the form of an inverted U and its bight 148 has rigidly secured thereto a forwardly and upwardly inclined support or angle bar 150 which is apertured at 152 for affixation to a structural member 154 that forms in effect an extension of the inner support 12, since the member 154 is fixed to the inner side sheet 16 as is the inner support 12. Bolts 156 may be used to interconnect the bracket 128 and the angle bar 150, and bolts 158 may be used to connect the front end of the angle bar 150 to the structural member 154, these bolts serving originally to mount a depending leg 160 which cooperates with another leg 162 on the member 154 to carry a transverse rod 164 by means of which are pivotally carried the rear ends of forwardly extending links 166 connected to the front arch 24.

From the description thus far, it will be seen that the rear bracket 70 is carried exclusively by the outer support 14, being mounted directly on that support by means of the flange 72 and being further connected at 118—120—122 to the power output housing 124. In any event, the rear mounting bracket 70 is free or clear of the inner support 12. Further, the front mounting bracket 128 is carried exclusively by the inner support 12, via the connection of the forwardly and upwardly inclining frame or angle bar 150 to the structural member 154 which, as already described, is secured to a forward extension of the inner side sheet 16 and thus in effect is part of the inner support 12. Moreover, since the front outer bearing 102 for the outer stalk roll 78 is carried directly by the outer support 14, as is the rear mounting bracket 70, adjustment of the nuts 144 and 146 on the adjusting shaft 138 will cause the front end of the inner roll 76 to move transversely relative to the outer roll 78, this movement being possible because of the generally upright axis afforded by the spherical bearing 92 in the bearing 88 of the mounting bracket. Adjustment of the rolls as just described varies the width of the stalk bite 94 between the rolls, at least at the front ends. Since the gears 96 and 98 are so close to the upright axis afforded by the spherical bearing 92, the adjustment will not materially affect the efficiency of the gearing, particularly because precision at this point is not particularly critical.

Drive means for the rolls 68 is designated generally by the numeral 168 and, as described above, includes the intermeshing gears 96 and 98 as well as a rear shaft extension 170 coaxially fixed to the rear end shaft 82 of the outer roll 78 and projecting rearwardly of the bearing 90 of the bracket 70 to be driven by bevel gearing 172 from an input shaft 174. This input shaft is journaled on a transverse horizontal axis by means of a bearing portion 176 integral with the bracket 70, the shaft projecting inwardly beyond the inner support 12 and having fixed to its free or inner end a drive member in the form of a sprocket 178. As part of the device 168 when furnished as an attachment, there is included a driving or output sprocket 180 adapted to be affixed to the free or inner end of the power output shaft 48. A drive chain 182 completes the drive connection between the shafts 48 and 174.

The top or upper edges of the side sheets 16 and 18 are reenforced respectively by fore-and-aft extending angles 184 and 186 and the stalk passage 20 is enclosed from the top by a fore-and-aft extending transverse top sheet 188. The outer side sheet 18 is rigidified by the connection thereof to the conveyor casing or housing 32 and because of the vertical dimension of the side sheet 16 and its inherent flexibility because of its sheet metal construction, it is capable of lateral deflection, which characteristic is utilized to provide lateral adjustment of the crop-engaging bite 66 between the harvester roll 60 and its companion stripper bar 62. That is to say, since the stripper bar 62 is located at the lower part of the side sheet 16, in general parallelism with the lower inner support 12, and since the side sheet is flexible, being connected to the other side sheet 18 only by the top structure 184—186—188, the stripper bar 62 may be moved transversely relative to the harvester roll 60.

The outer side sheet 18 is additionally reenforced by an upright angle member 190, and a similar member 192 accomplishes the same purpose relative to the inner side sheet 16. A transverse brace 194 is rigidly secured to the upright angle 190 and to the fore-and-aft angle 186, being additionally braced relative to the upright angle 190 by a diagonal brace 196. The upright angle 192 constitutes an arm having a lower part 198 lying along the side sheet 116 below a pivotal connection 200 to the inner end of the transverse brace 194. This arm also includes an upper part 202 above the pivot at 200. Stated otherwise, the upright angle 192 comprises a lever of the first class fulcrumed at 200 and having its force-receiving arm at 202 and its force-transmitting arm at 198. Consequently, force applied in either of opposite transverse directions to the arm part 202 causes the member or angle 192 to pivot at 200, thereby swinging the lower part of the arm 198 selectively inwardly and outwardly, as a consequence of which the stripper bar 62 is moved toward or away from the harvester roll 60.

The force-applying means for pivoting the upright angle 192 is designated generally by the numeral 204 and comprises inner and outer trunnion nuts 206 and 208 internally threaded with threads of opposite hand and coaxially arranged to carry an adjusting rod 210 having opposite threaded ends 212 and 214 respectively, received by and cooperating with the trunnion nuts 206 and 208, so that angular movement of the rod selectively in opposite directions causes the trunnion nuts 206 and 208 to move transversely either toward or away from each other. The trunnion nut 206 is connected to the upper arm part 202 of the upright angle 192, and the trunnion nut 208 is connected to an upright extension 216 rigid on the transverse brace 194. Thus, the force-applying means 204 is effective between the brace 194 and the upper arm part 202 of the upright inner angle 192.

Selective rocking of the adjusting rod 210 is accomplished by a hand lever 218 pivoted at 220 on a sector 222 mounted on the rear portion of the unit via the top sheet 188. A forwardly extending link 224 is pivotally connected at its rear end to the hand lever 218 and is pivotally connected at 226 to an arm 228 rigid on the adjusting rod 210. Rocking of the hand lever 218 in one direction or the other causes the adjustment of the stripper bar 62 relative to the harvester roll 60.

Since the forward end of the inner roll 76 is carried by the side sheet 16 by means of the inner support 12 and associated structure at 128, 150 and 154, it follows that lateral adjustment of the stripper bar 62 relative to the harvester roll 60 will affect the width of the bite 94 between the forward ends of the stalk rolls 76 and 78. However, this change can be compensated for because of the independent adjustment of the forward end of the roll 76 relative to the forward end of the roll 78 by means of the adjustment at 138—144—146. However, once the adjustment of the stripper bar 62 relative to the harvester roll 60 is achieved, variations in the bite 94 between the rolls 76 and 78 may be accomplished without affecting the adjustment of the harvester bite 66.

Because of the flexibility of the inner side sheet 16 and the location of the upright angle 192 at the forward portion thereof, adjustment of the side sheet 16 by the adjusting means 204 will accomplish primarily an adjustment of the forward portion of the stripper bar 62, since the rearward portion of the side sheet 16 will tend to remain in a fixed upright plane. This result follows even though the lower part of the side sheet 16 is normally not connected to any other structural part of the harvester. This result would be present in a conventional design of harvester without the addition of the device 68. However, this device provides an additional feature in that the rear portion of the side sheet 16 is made adjustable so that the stripper bar 62 may be maintained in exact parallelism with the harvester roll 60.

The latter phase of adjustment is accomplished by adjusting means designated generally by the numeral 230 and including an elongated rigid bar 232 having a plurality of apertures 234 therein for receiving fastening means in the form of bolts 236 by means of which the bar is secured to and along the inner support 12. As shown in Fig. 5, the support 12 has a plurality of holes 238 therein for receiving the bolts 236. The front end of the bar 232 is secured, as by a bolt 240, to the bracket 128 at the front of the device 68. The rear end of the bar is laterally inwardly offset at 242 and is apertured to receive an adjusting member in the form of a threaded bolt 244, the outer end of which is rigidly carried by the rear mounting bracket 70 and an intermediate threaded portion of which carries a pair of jam nuts 246 and 248, the adjustment of which determines the transverse spacing between the bar 238 and the bracket 70. Mounting of the bolt 244 in the bracket 70 may comprise threading the bolt into the bracket and securing its position by a jam nut 250. However, these details are immaterial as long as the bolt extends laterally from the bracket 70 and contains provision, such as the nuts 246 and 248, for adjustably fixing the position of the rear end of the bar 232. Transverse movement of the bar 232 is followed, of course, by transverse movement of the rear portion of the side sheet 16. Hence, after an adjustment of the front part of the side sheet 16 is effected by the adjusting means 204, adjustment of the rear part will follow by adjustment of the means 230.

The operation of the machine will be apparent from the foregoing description without elaboration. It will be clear, of course, that the machine may be used with or without the device 68, the presence or attachment of the device becoming necessary mainly in those conditions in which the uprooting of stalks is a problem. As already indicated, attachment and detachment of the device is a simple matter. Various other features of the invention not categorically enumerated herein will undoubtedly occur to those versed in the art, as will many modifications and alterations in the preferred embodiment disclosed, all of which may be achieved without departing from the spirit and scope of the invention. What is claimed is:

1. In a harvester adapted to advance over a field of row-planted stalk-borne crops and including inner and outer upwardly and rearwardly inclined supports respectively having front and rear ends and spaced apart transversely to the line of advance to define between them a fore-and-aft plant-receiving passageway in which crop-engaging means is operative to detach crops from the stalks of passageway-received plants as the harvester advances, and wherein the inner support is transversely adjustable relative to the outer support to vary the width of the passageway, the improvement residing in a stalk-clearing device operative to effect a downward force on passageway received stalks to prevent such stalks from clogging the passageway, said device comprising: a rear bracket carried by the outer support below the crop-engaging means and extending inwardly across the passageway and clear of the inner support; inner and outer side-by-side stalk engaging rolls rotatable respectively on generally fore-and-aft axes below the crop-engaging means and defining a fore-and-aft stalk bite substantially in vertical alinement with the plant-receiving passageway, said rolls respectively having rear ends journaled in the rear bracket and front ends respectively proximate to the front ends of the supports, the journaling of the rear end of the inner roll including means affording a generally upright axis about which said inner roll may swing laterally relative to the outer roll and thus to vary the width of the stalk bite; a front outer bearing carried by the front end of the outer support and journaling the front end of the outer roll; a front bracket carried by the front end of the inner support; a front inner bearing journaling the front end of the inner roll and mounted on the front bracket for transverse adjustment relative to said bracket to effect width variations in the stalk bite; an elongated rigid bar having a front end connected to the front bracket, an intermediate portion connected to the inner support and a rear end proximate to the rear bracket; means including transversely adjustable cooperative elements connecting the rear end of the bar to the rear bracket for adjusting said bar and the inner support in unison and relative to the rear bracket and outer support to vary the width of the plant-receiving passageway; and drive means for rotating the rolls in unison but in opposite directions so that the proximate surface portions thereof move downwardly in the stalk bite to grip and exert a downward force on stalks received in said bite.

2. In a harvester of the type set forth in claim 1 and further characterized by the inclusion of means for driving the crop-engaging means including a power output member projecting transversely inwardly adjacent to the rear end of the inner support, the further improvement on the invention defined in claim 1 of: power input means carried by the rear bracket and connected to the aforesaid drive means for the rolls and including a power input member projecting transversely inwardly adjacent to the power output member; and a drive-transmitting element interconnecting the power output and power input members.

3. The invention defined in claim 2, in which: the drive means for the rolls includes intermeshing gears respectively coaxially fixed to the rear ends of the rolls ahead of the rear bracket, a coaxial shaft extension on one roll and projecting behind the rear bracket, and bevel gearing interconnecting the shaft extension and the power input member.

4. In a harvester of the type set forth in claim 1, further characterized by the inclusion of inner and outer upright relatively flexible side sheets rising respectively from the inner and outer supports, the further improvement on the invention defined in claim 1 of: means for adjusting the front end of the inner support and inner side sheet independently of the adjustment afforded by the aforesaid transversely adjustable cooperative elements, said means comprising a transverse brace interconnecting the side sheets above the supports, an arm pivoted to the brace and having a lower part extending downwardly along and connected to the inner side sheet and an upper part projecting above the brace and force-applying means connected between the brace and the upper part and the arm for swinging the arm about its pivotal connection and thereby to adjust the front end of the inner support and inner side sheet transversely relative to the front end of the outer support and outer side sheet.

5. The invention defined in claim 4, in which: the force-applying means includes a first trunnion nut mounted on the brace, a second trunnion nut coaxial with the first nut and mounted on the upper part of the arm, said nuts being respectively internally threaded with threads of opposite hand, an adjusting rod having opposite ends externally threaded to cooperate respectively with the nuts, and means for turning the rod selectively in opposite angular directions.

6. The invention defined in claim 1, in which: the front bracket comprises an inverted C-shaped member having inner and outer legs apertured coaxially on a transverse axis and arranged with the outer leg proximate to the front inner bearing; and the mounting of the front inner bearing on said bracket includes a shaft fixed at one end to said front inner bearing and passing through the apertured legs, the other end of said shaft being threaded and carrying a pair of adjustable nuts thereon, one nut being inside and the other nut being outside the inner leg of the bracket.

7. The invention defined in claim 1, including: a trash bar secured to at least one of the supports and extending crosswise of and below the stalk rolls closely ahead of the rear bracket.

No references cited.